United States Patent [19]

Kubota

[11] Patent Number: 4,930,022
[45] Date of Patent: May 29, 1990

[54] METHOD AND DEVICE FOR IMAGE REDUCTION IN IMAGE PROCESSING

[75] Inventor: Mineo Kubota, Kofu, Japan

[73] Assignee: Nippon Seimitsu Kogyo Kabushiki Kaisha, Kofu, Japan

[21] Appl. No.: 281,329

[22] Filed: Dec. 8, 1988

[30] Foreign Application Priority Data

Jun. 2, 1988 [JP] Japan ................. 63-136221

[51] Int. Cl.$^5$ ............................. H04N 1/40
[52] U.S. Cl. ..................... 358/451; 358/457
[58] Field of Search ............. 358/283, 280, 287, 443, 358/447, 448, 449, 451, 457, 465, 466; 382/47

[56] References Cited

U.S. PATENT DOCUMENTS

| | | | |
|---|---|---|---|
| 4,639,790 | 1/1987 | Kusaka | 358/293 |
| 4,740,844 | 4/1988 | Yoshimura | 358/283 |
| 4,758,897 | 7/1988 | Hiratsuka et al. | 358/283 |
| 4,803,558 | 2/1989 | Hiratsuka et al. | 358/283 |
| 4,827,353 | 5/1989 | Ehlers et al. | 358/451 |

FOREIGN PATENT DOCUMENTS

0142482  7/1985  Japan ................. 382/47

Primary Examiner—Edward L. Coles, Sr.
Assistant Examiner—Jerome Grant, III
Attorney, Agent, or Firm—Oblon, Spivak, McClelland, Maier & Neustadt

[57] ABSTRACT

Dither element values predetermined at all pixels of a dither matrix pattern prepared for an equality function are outputted one by one each time on $n \times n$ unit matrix of a read-out image obtained from a given original image by an image reading device such as an image scanner is subjected to extraction of brightness feature in $1/n$ image reducing mode. Thus, even a halftone image such as a photograph can be effectively reduced to scale an reproduced as a reduced image on a monitor display or the like.

5 Claims, 8 Drawing Sheets

FIG_3

FIG_6

METHOD AND DEVICE FOR IMAGE REDUCTION IN IMAGE PROCESSING

BACKGROUND OF THE INVENTION

1. Field of the Invention

This invention relates to a method and device for image reduction of a read-out image outputted from an image reading means such as an image scanner, and more particularly to a method and device for allowing a read-out image obtained from a halftone image such as a photograph to be reduced to scale in accordance with a dither pattern and outputted to a monitor display of an image processing system, a printer of a wordprocessor or the like.

2. Description of the Prior Art

Not infrequently there are times when a read-out image obtained by using an image reading means such as an image scanner is reproduced on a reduced scale on a monitor display of an image processing system or the like. When a given objective image of 100mm in width is read out by use of an ordinary image scanner having a resolution of 8 dots/mm, a resultant read-out image represented in terms of binary bits is composed of picture elements of as many as 800 dots in the width direction. However, an ordinary monitor display such as a CRT which is widely applied to general purpose computers for image processing has generally a display field of a resolution of 640×400 picture elements. This means that the read-out image from the image scanner cannot be completely displayed on such a monitor display. It is therefore necessary to reduce a read-out image to be displayed on the monitor display. Therefore, an image-reducing process has been conventionally carried out by thinning out, for example, every other pixel to reduce the read-out image to a scale of one-half.

Thus, in order to reduce the read-out image to half the originally given image, every matrix with 2 rows and 2 lines (2×2 matrix) in the read-out image pattern may be simply reduced to 1×1 matrix (one pixel). In a case of reducing a high-contrast pattern such as a character which can easily be subjected to simple digitization processing, the visual impressions of the resultant image which is obtained as a result of subjecting a given character pattern to simple digitization processing and thinning-out processing is little removed from the original character image. However, in a case that a digitized image which is obtained from an originally given halftone image such as a photograph by being subjected to simple digitization processing is simply thinned out every other pixel to be reduced to half the original to obtain a reduced image, the reduced image thus obtained is not visually faithful to the original halftone image.

There is generally known a dither image-processing method for subjecting a given halftone image to image digitization. This dither image-processing method will be explained in brief with reference to the typical dither pattern model illustrated in FIG. 1(A). First, a given original image Io to be subjected to image processing is virtually defined in a matrix and the level of brightness at each picture element of the matrix of the original image thus defined is measured to obtain a brightness matrix pattern Mb. In the illustrated dither pattern model, the brightness is expressed in 16 gradient levels as illustrated in FIG. 1(B). Next, the level of brightness at each picture element of the brightness matrix pattern Mb is compared with threshold value prescribed in each pixel of a predetermined dither pattern D1. When the level of brightness at one picture element of the brightness matrix pattern Mb is lower than the threshold value of the corresponding pixel of the dither pattern D1, the picture element is regarded as being "black", thereby to obtain an intermediate dither image Id to be outputted to a monitor display or printer. This dither image processing method has been generally applied to image processing because it can reproduce the given halftone image with relatively high fidelity of image to the original.

Figure 2A:
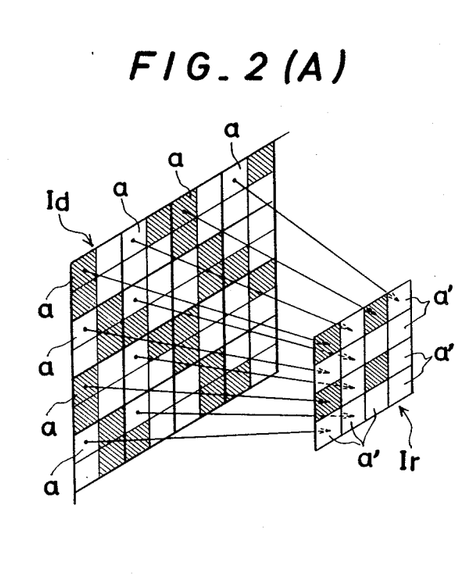
FIGS. 2(A) to 2(C) are explanatory views diagrammatically illustrating models practicing conventional image reducing methods.
Figure 2B:
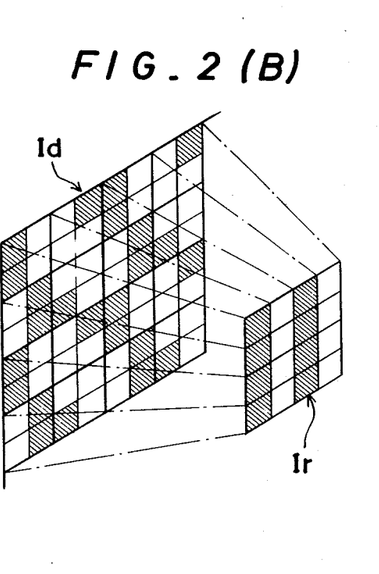
Figure 2C:
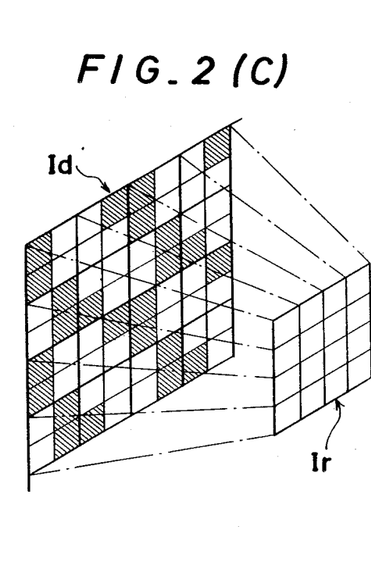

In a case where the intermediate dither image Id obtained by the aforementioned processes is reduced to one-half, there have been so far used such image reducing methods as illustrated in FIGS. 2(A) to 2(C). According to these conventional methods, in its own way, the intermediate dither image Id can be reduced to one-half by reducing every 2×2 matrix to one picture element. In the image reducing method shown in FIG. 2(A), brightness feature in every picture element of a reduced resultant image Ir to be outputted to a monitor display or the like is determined on the basis of the brightness of one pixel at a specific location in a unit matrix. Namely, in the first model illustrated in FIG. 2(A), the upper and left picture elements (pixels a) in every unit matrix of 2×2 pixels are simply applied to the respective picture elements a' in the reduced image Ir. In the second model illustrated in FIG. 2(B), when the unit matrix with 2×2 pixels in the intermediate dither image Id has two or more black picture elements, the corresponding picture element in the reduced image Ir is determined as a "black" picture element. Conversely, when the unit matrix with 2×2 pixels of the intermediate dither image Id has two or more white picture elements, the corresponding picture element in the reduced image Ir may be determined as a "white" picture element, as illustrated in FIG. 2(C). However, as is apparent from the resulting patterns of the reduced images Ir, all the reduced images are wholly different in visual impressions from the given original images Io. Thus, the conventional image reducing methods could not reproduce a halftone image such as a photograph with high fidelity of image to the original and were not practical use.

OBJECT AND SUMMARY OF THE INVENTION

An object of this invention is to provide a method and device capable of reducing and reproducing a halftone image such as a photograph with high fidelity of image to a given original image on a monitor display of an image processing system, a printer of a wordprocessor, a facsimile or the like.

To accomplish the object described above according to the present invention, there is provided a method for image reduction of a read-out image obtained by digitizing a given original image, which comprises comparing brightness of each pixel of the read-out image with dither values of the corresponding pixel in a predetermined dither pattern so as to obtain an intermediate dither image, which dither values are outputted one by two or more dither element values constituting a prescribed unit matrix with n-rows and n-lines, and extracting brightness features of the respective unit matrices in the intermediate dither image, thereby to obtain a reduced image.

The present invention further attains the aforesaid objects by providing a device for image reduction of a read-out image obtained by digitizing a given original image, which comprises a dither setting circuit having a dither pattern defined in a unit matrix with n-rows and n-lines, a mode selection circuit for selecting one of equality mode, enlarging mode and reducing mode, and a scanning control circuit adapted to output one scanning pulse every two or more timing clock pulses when the image reducing mode is selected by the mode selection circuit.

The read-out image which is obtained by digitizing a given original image by use of an image reading device and expressed as a brightness matrix pattern is transformed into the dither image by comparing the brightness of each of the pixels constituting the brightness matrix pattern with the dither element values which are predetermined and derived by one from the dither pattern each time a unit matrix of m-rows and m-lines of the read-out image is read out when the 1/m reducing mode is selected. From each unit matrix of the dither mode thus transformed, the brightness feature is extracted to produce a required resultant image reduced to 1/m of the given original image. The resultant pattern of the reduced image which is displayed on a monitor display or outputted to a printer, a facsimile or the like is visually faithful to the originally given image. Therefore, even a halftone image such as a photograph can effectively be reduced to scale and reproduced as a reduced image on the monitor display or the like with high fidelity of image to the original.

The features of the present invention which are believed to be novel are set forth with particularity in the appended claims. The present invention, both as to its organization and manner or operation, together with further objects and advantages thereof, may best be understood by reference to the following description, taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 3:
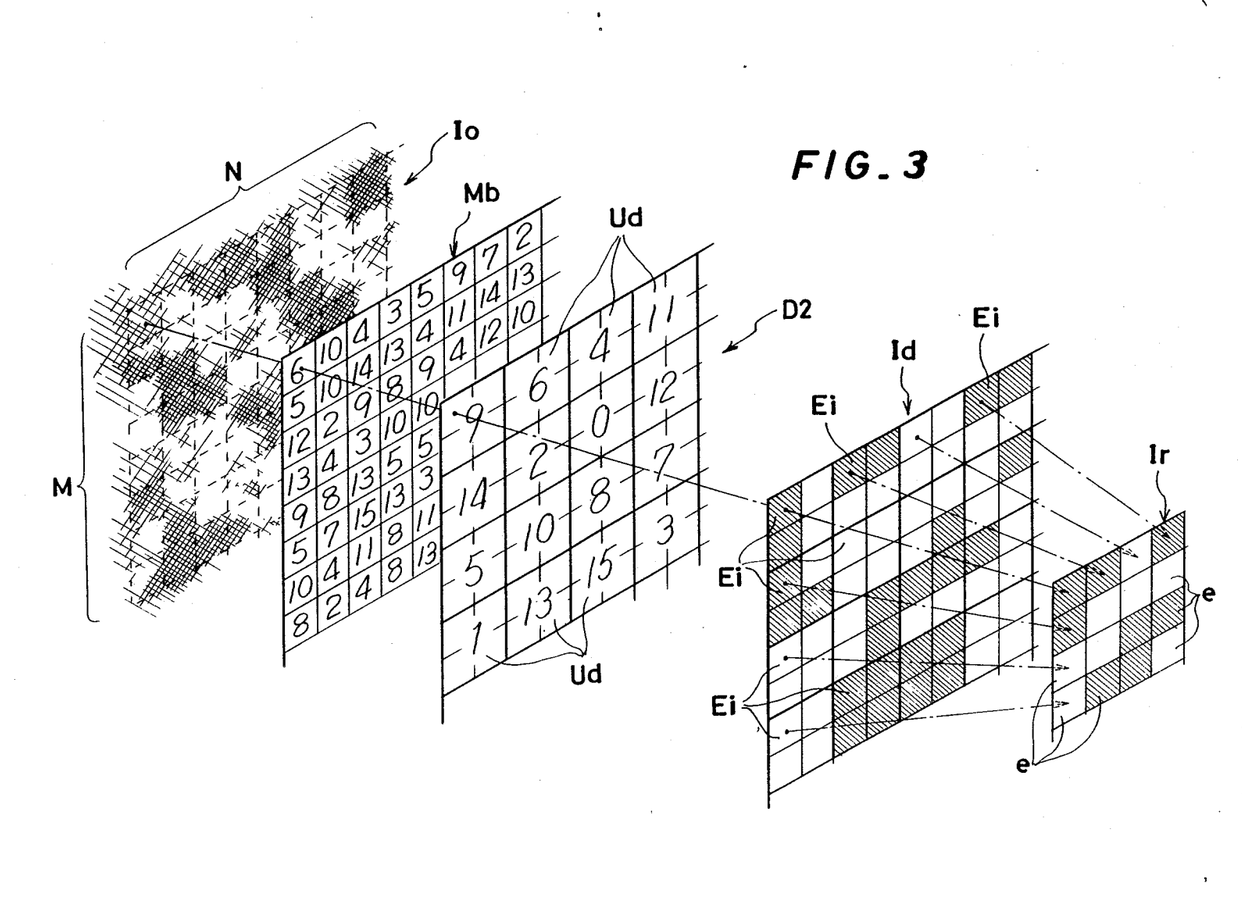
FIG. 3 is a diagrammatic illustration showing one example of a model embodying an image reducing method according to this invention.

The principle of the image reducing method according to this invention will be explained with reference to a conceptional model illustrated in FIG. 3. An image processing system capable of practicing the image reducing method of this invention basically has not only an image reducing function, but also functions of processing a given image on a full or enlarged scale (equality and enlarging functions), similar to an ordinary image processing device capable of processing a halftone image in accordance with a predetermined dither pattern. The equality function by which the given original image is displayed on a monitor display on an equal scale will be understood from the model illustrated in FIG. 1(A). Specifically, this invention has as its object the image reducing function of reducing a read-out image obtained from the given original halftone image by use of an image reading device such as an image scanner to a scale of 1/n. The enlarging function can easily be fulfilled merely by magnifying each pixel of the read-out image outputted from the image reading device to two or more times.

The image reducing function of the present invention will be described hereinafter with reference to FIG. 3. Here, let it be supposed that a ½ reducing mode is selected as an example. First, the given original image Io to be displayed on the monitor display is read out by use of the image scanner and so on in such a manner that the brightness at each of picture elements constituting the original image defined virtually in a matrix is detected. In the illustrated embodiment, the original image Io is defined in the matrix with N-rows (picture elements aligned in the main scanning direction) and M-lines (picture elements aligned in the sub-scanning direction). In FIG. 3, only one unit matrix composed of 8×8 picture elements (i.e. N=M=8) is illustrated for convenience's sake. Therefore, the pitch (pixel interval) between the adjacent picture elements is ⅛ mm when the image reading device used for reading out the original objective image has the resolution of 8 dot/mm. Thus, the brightness is detected at all the picture elements of the original image and can be represented in the digital value, e.g. in terms of binary bits, thereby to obtain a brightness matrix pattern Mb as a read-out image. In the drawing, the brightness at each pixel of the brightness matrix pattern Mb is shown in 16 gradient numerical values as an example.

The brightness matrix pattern (read-out image) Mb thus obtained is compared with a predetermined dither pattern D2 for image reduction. That is, the brightness at each pixel of the read-out image Mb is compared with a prescribed dither element value (threshold) at the corresponding pixel of the dither pattern D2. When the brightness value at one pixel of the read-out image Mb is equal to or smaller than the prescribed dither element value at the corresponding pixel of the dither pattern D2, the pixel of the read-out image may be determined as a "black" picture element or respectively; vice versa. When the brightness value of the same is larger than the corresponding dither element value, the pixel may be determined to be a "white" picture element, or respectively; vice versa. Thus, an intermediate dither image Id can be obtained. Although the brightness level scale is expressed in 16 gradient levels as illustrated in FIG. 1(B), this should not be understood as limitative as a matter of course. In the brightness level scale of FIG. 1(B), the level "0" designates "black" and the level "16" designates "white" The scale may however be inverted. In this connection, the level "8.5" designates neutral tints "gray".

Therefore, when the dither image is obtained as a result of the image dither processing is macroscopically view, a resultingly reproduced image which is represented by the 16 gradient brightness levels is very faithful to the original image.

Figure 1A:
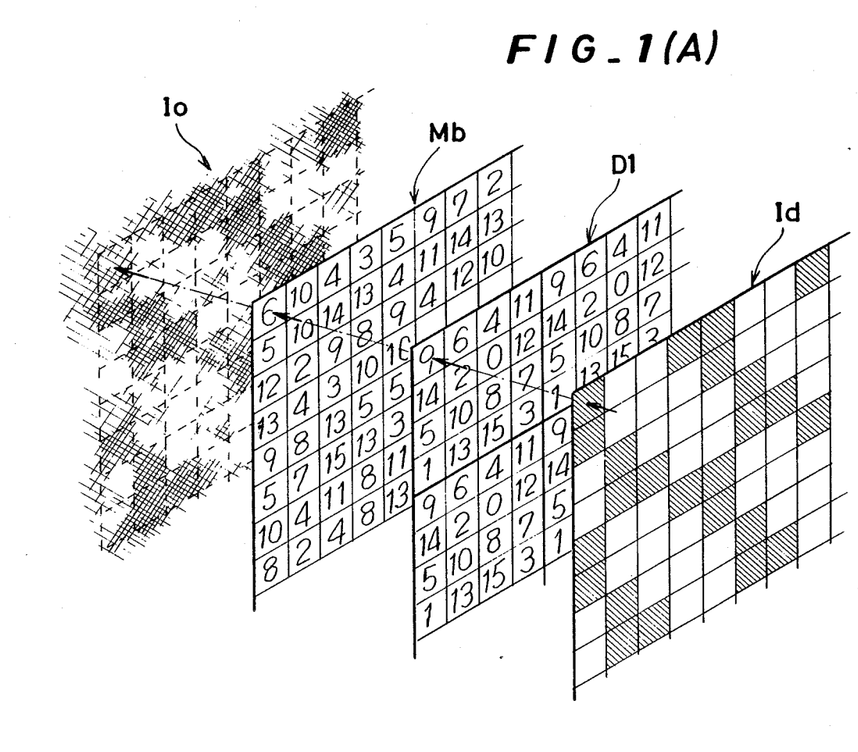
FIG. 1(A) is a diagrammatic illustration for explaining the principle of a dither processing system applicable to halftone image processing.
Figure 1B:
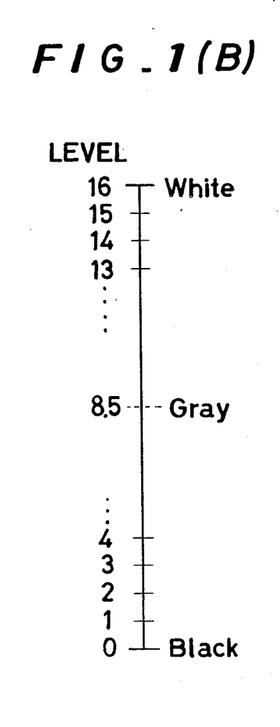
FIG. 1(B) is a diagrammatic illustration of one example of a brightness level scale applied to the image processing according to this invention.

In this embodiment, the dither pattern D2 for image reduction processing which is the principle element of the present invention is obtained by expanding a unit dither pattern prepared for the equality processing (the 8×8 matrix dither pattern D1 as shown in FIG. 1(A)) to a 16×16 matrix. That is to say, the dither element value of one pixel in the equality dither pattern occupies one unit region Ud of a 2×2 matrix in the dither pattern prepared for the image reduction processing. In the equality mode, the equality dither pattern (n×n matrix) as indicated by symbol D1 in FIG. 1(A) is repeatedly used by the number of times obtained by dividing the total numbers of pixels in the respective row and line directions by the number of the row or line numbers of the dither pattern. However, the unit dither matrix D2 in the ½ reducing mode of this invention is defined by a 2n×2n matrix. In a case where the reduction rate is determined to 1/m, an mn×mn matrix is used as the dither pattern D2. As a matter of course, the numbers n of the pixels in the row and line directions of the unit dither pattern are variable (e.g. 3×3, 5×5 or more matrix) and may differ from each other (e.g. n×n' matrix).

An image processing system for effecting the image processing according to the prescribed dither pattern may be basically provided with only one program of dither matrix prepared for the equality mode, for example, a dither matrix with at least 4×4 picture elements (16 pixels). To be more specific, in the equality mode, the programmed dither pattern D1 for the equality mode may be used repeatedly in the row and line directions of the matrix by the number of times obtained by dividing the total numbers of the pixels of the read-out image by the number n of the n×n dither matrix, as touched upon above. On the other hand, in the reducing mode, the dither element values prescribed in the n×n dither matrix prepared for the equality mode may be outputted in order one by one each time two (or more) pixels in either directions of the row and line of the read-out image matrix are read out. Namely, one dither element value prescribed in the dither matrix D2 is applied to two (or more) pixels of the read-out image Mb in the reducing mode. Therefore, it is unnecessary to prepare an additional dither pattern for the reducing mode.

Figure 4:
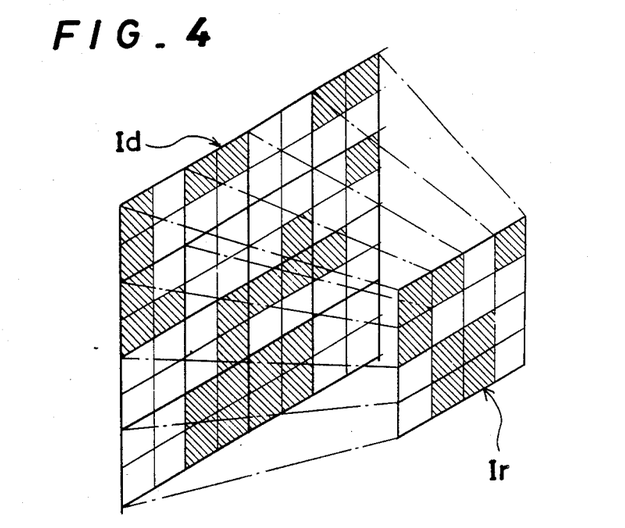
FIG. 4 is a diagrammatic illustration showing another example of the model embodying the image reducing method according to this invention.

Subsequently, the intermediate dither image Id obtained in the aforementioned manner is subjected to image reduction processing. The image reduction is effected on the basis of the brightness feature of each of the unit matrix region defined in the intermediate dither image Id. In the illustrated embodiment in FIG. 3, picture elements e in the resultant reduced image Ir are determined according to the upper and left picture elements Ei in the unit matrix regions (4×4 matrix) of the intermediate dither image Id. Also, as illustrated in FIG. 4, when the unit matrix region in the dither image Id has two or more black elements, the corresponding picture element e may be regarded as a "black" picture element. Namely, the picture element e of the reduced image Ir is determined to be "black" when the black elements equal to or more than half the total picture elements of the dither image Id exist. Though there is a slight difference between the resultant reduced images Ir shown in FIGS. 3 and 4, these reduced images are far better in fidelity of image to the original image, compared with those of the conventional reducing methods shown in FIGS. 2(A) to 2(C) from the point of view of visual impressions.

In other words, one of dither element values which are prescribed in the dither pattern D1 for the equality mode can be equivalently assumed to be outputted for one unit matrix (2×2 matrix in FIG. 3) of the intermediate dither image Id. Thus, the brightness features of all the unit matrices in the dither image Id can be extracted to the required pattern of the reduced image Ir.

Figure 5:
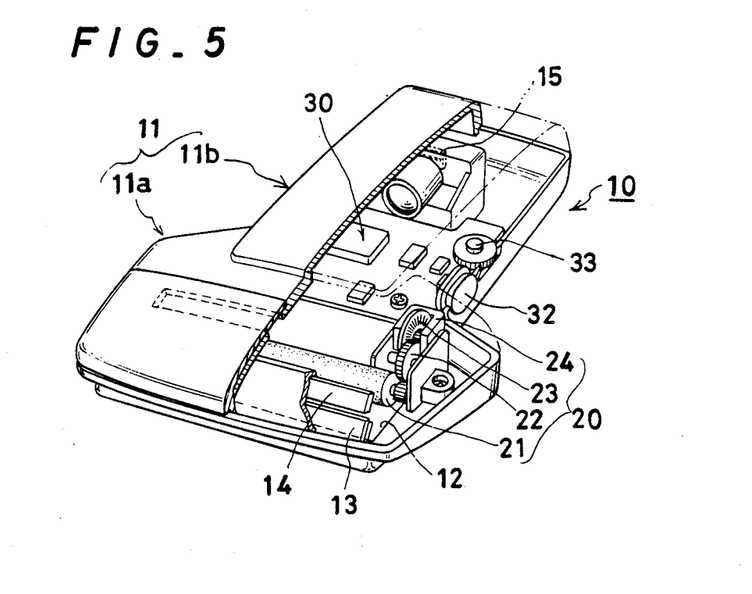
FIG. 5 is a schematically perspective view of one example of an image scanner applicable to this invention.

Next, the image reading device and the processing system applied to one embodiment of this invention will be described with reference to FIGS. 5 and 6.

The image scanner 10 is constituted by optical scanning means having an illuminator for illuminating the given objective image and a photoelectric element, and sub-scanning encoder means. A casing 11 for accommodating the aforementioned means is defined by a reader portion 11a on the front part thereof and a grip portion 11b on the rear part thereof. In the bottom of the reader portion 11a, there is formed a reading opening 12 which gives a view of the given objective image plane I.

The optical scanning means noted above comprises a light source 13 for illuminating the objective image plane I through the reading opening 12, a reflecting means 14 for reflecting rearward a desired image light reflected from the objective image plane I in the direction substantially parallel to the objective image plane I, and an image sensor 15 for converting the image light from the objective image plane I to electric image data signals (video signals Vo). In this embodiment, there is adopted a line scanning method in which the objective image to be scanned for reading out is notionally divided into a plurality of sub-scanning lines and scanned every sub-scanning line in order. Therefore, the light source 13 may be of the type capable of illuminating a linear portion on the objective image plane I, and the image sensor 15 may be of the type capable of picking up as an image the linear portion illuminated with the light source 13. For instance, an array of light emitting diodes (LED) can be used as the light source 13, and a CCD line sensor can be used as the image sensor 15.

A sub-scanning encoder 20 contained in the casing 11 comprises a roller 21 for allowing the image scanner 10 to be manually moved in the sub-scanning direction, at least one gear 22 for transmitting the rotation of the roller 21, a synchronizing rotary disc 23 which rotates synchronously with the roller 21, and a rotation detector 24 for detecting the rotation of a predetermined amount of the rotary disc 23. The rotary disc 23 has a plurality of slots arranged radially. As the rotation detector 24, a photo-coupler or photo-interrupter may be used so that switching action can be optically effected by the existence of the slots formed in the rotary disc 23, thereby to output sub-scanning encoder pulses Ep by the anglar rotation of the predetermined amount of the rotary disc 23.

Further, the image scanner 10 is provided with a control unit 30 for treating the image data signals outputted from the image sensor 15 and the encoder pulses generated by the sub-scanning encoder 20. The control unit 30 has a timing pulse generator 31 for regularly generating timing clock pulses necessary for synchronous processing of the image data signals.

The image scanner 10 is provided with a switch 32 for manually switching on the scanner and a dial 33 for adjusting the tone or contrast of the resultant image to be outputted to the monitor display or the like.

Figure 6:
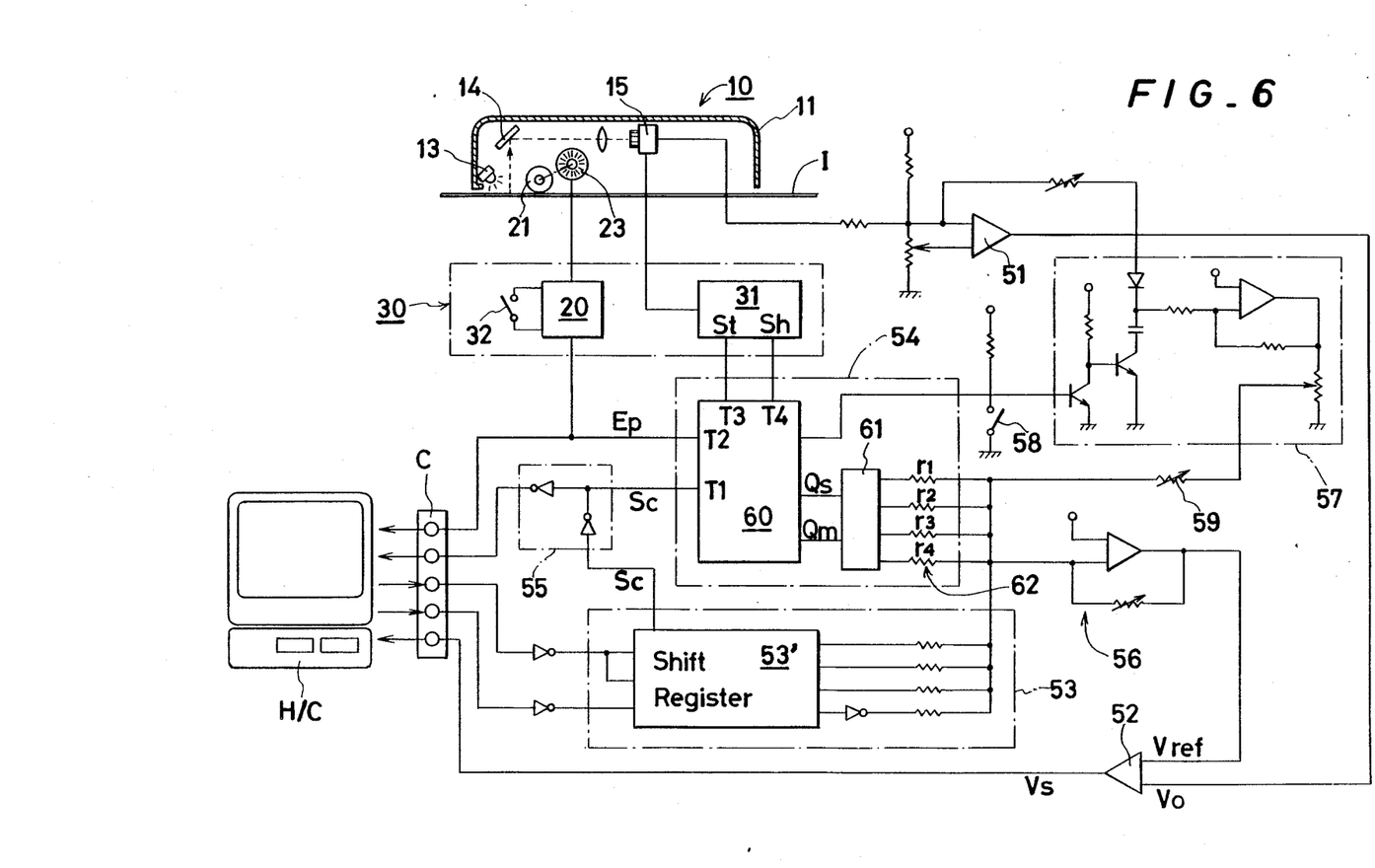
FIG. 6 is a block diagram of one embodiment of an image processing circuit for practicing the image reducing method according to this invention.

The control unit of the image scanner 10 has an amplifier circuit 51 for subjecting the image data signals outputted from the image sensor 15 to negative feedback or inverting amplification, a comparator 52 adapted to compare the image data signals Vo outputted from the amplifier circuit 51 with a reference voltage Vref so as to produce digitized (e.g. binary-coded) video signals Vs, as illustrated in FIG. 6. By controlling the reference voltage Vref, various functions can be obtained. That is, the reference voltage Vref is controlled by such functional circuits as a tone regulating circuit 53 for freely determining the tone of the resultant image to be reproduced on the monitor display, a dither setting circuit 54 having a function of processing a halftone image, a mode selection circuit 55 capable of setting magnification ratio of the resultant image, and other image processing circuits. The output signals from the aforementioned functional circuits are given to a reference voltage generator 56 by which the reference voltage Vref is varied with the outputs from the dither setting circuit 54 and outputted to the comparator 52. By turning on a switch 58 to operate an envelope regulation circuit 57 so as to detect an envelope of the image data outputted from the image sensor 15, the halftone image such as a photograph is processed by subjecting the image data represented in the envelope form to pseudo-digitization on the basis of the dither pattern programmed in the dither setting circuit 54. In the off-state of the switch 58, simple digitization is effected for processing a high-contrast image such as a character. The tone regulation is effected in accordance with instructions from the external image processing device (host computer) H/C, which are given to a shift register 53' in the tone regulating circuit 53. Shading strains, which are inevitably brought about due to unevenness in illumination or image ground, can be eliminated by a shading-correction circuit 59.

The dither setting circuit 54 comprises a scanning control circuit 60, a dither decision circuit 61 and a dither matrix resistance circuit 62 as schematically illustrated in FIG. 6. In the illustrated embodiment, the dither matrix resistance circuit 62 is substantially composed of four resistors r1 to r4 which are determined in accordance with the prescribed 16 brightness levels, so that the reference voltage values Vref with which the brightness values of the picture elements of the read-out image Mb are compared to obtain the intermediate dither image Id are outputted in accordance with the corresponding dither element values programmed in the form of the dither pattern. That is, 16 levels of potential (reference voltage values) can be identified to one with 4 bits by bringing the four resistors r1 to r4 in a multiple relation (i.e. $8 \times r1 = 4 \times r2 = 2 \times r3 = r4$). Therefore, the reference voltage values Vref are selectively derived according to the predetermined dither pattern by selecting one or more resistors r1 to r4 under the control of the dither decision circuit 61.

In the case of selecting the equality mode, the reference voltage value Vref is updated each time the pixels of the read-out image are sequentially compared one by one with the corresponding reference values Vref. That is, the dither element values in the main scanning direction prescribed in the dither pattern are updated one by one each time one main scanning pulse is outputted from the timing pulse generator 31, and the dither elements values in the sub-scanning direction are updated one by one each time one sub-scanning pulse is outputted from the sub-scanning encoder 20.

Figure 7:
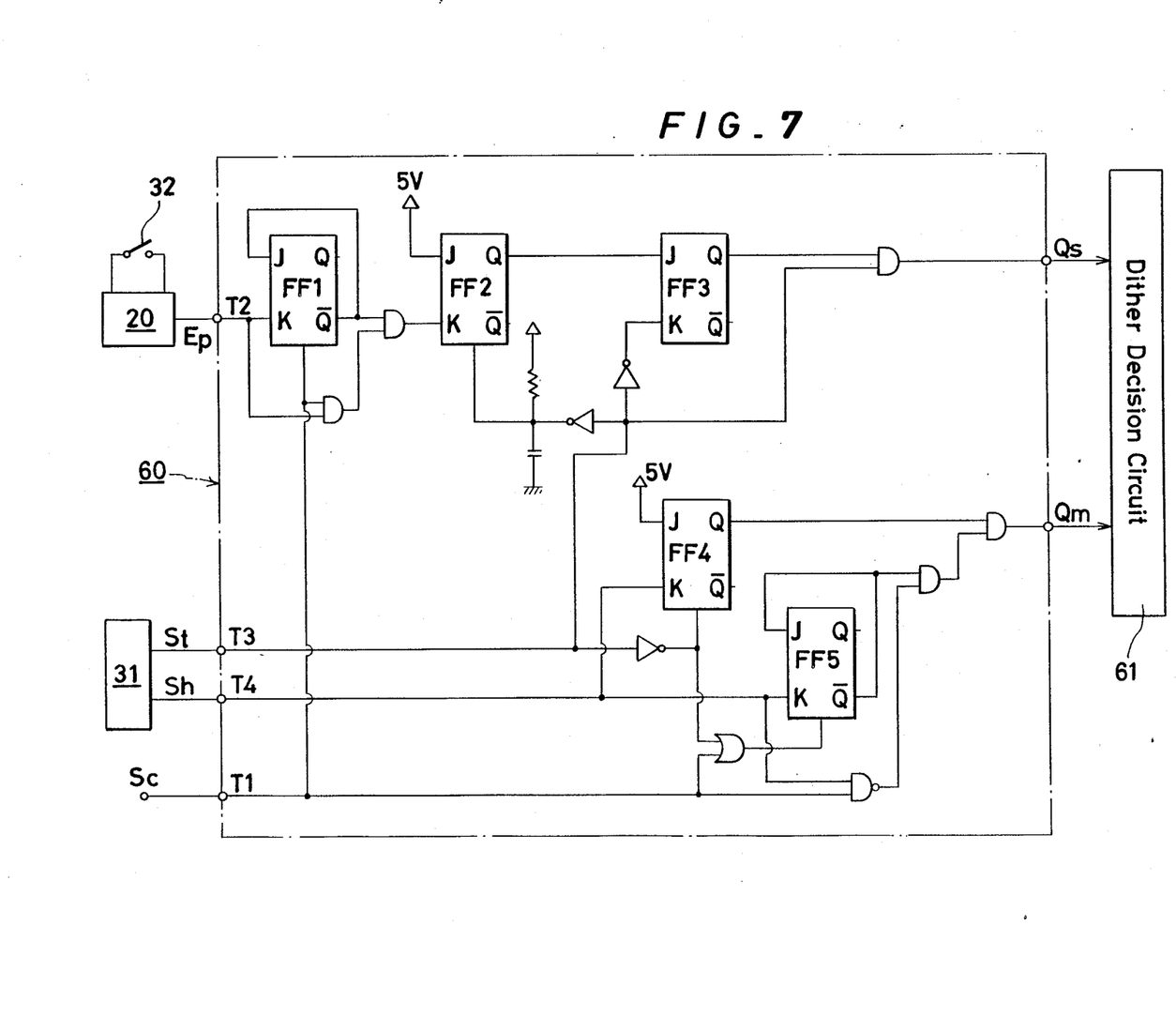
FIG. 7 is a block diagram of one example of a scanning control circuit used in this invention.

In a case where a mode selection signal Sc to be fed from the external image processing device H/C to the dither setting circuit 54 through the shift register 53' in the tone regulating circuit 53 signifies the image reducing mode, the main scanning timing clock pulses Sh outputted from the timing pulse generator 31 are properly thinned by the scanning control circuit 60 in the reducing mode. Likewise, the sub-scanning encoder pulses Ep fed from the sub-scanning encoder 20 are annulled every other pulse in the ½ reducing mode. The scanning control circuit 60 is schematically illustrated in FIG. 7. The operation for thinning the main scanning timing clock pulses Sh is shown by the time chart of FIG. 8(A), and the operation for thinning the sub-scanning encoder pulses Ep is shown by the time chart of FIG. 8(B). As will be understood from these time charts, either of the equality and reducing modes can freely be selected by controlling the mode selection signal Sc fed from the image processing device H/C.

Figure 8:
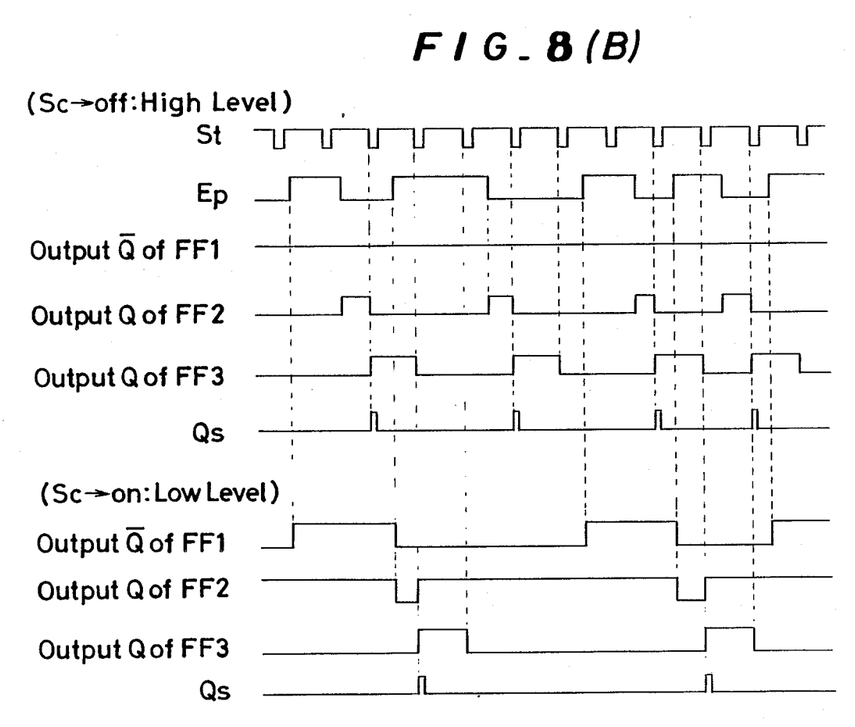
FIGS. 8(A) and 8(B) are time charts concerning the processing of pulse forms in the essential part of the circuit in FIG. 7.
Figure 8A:
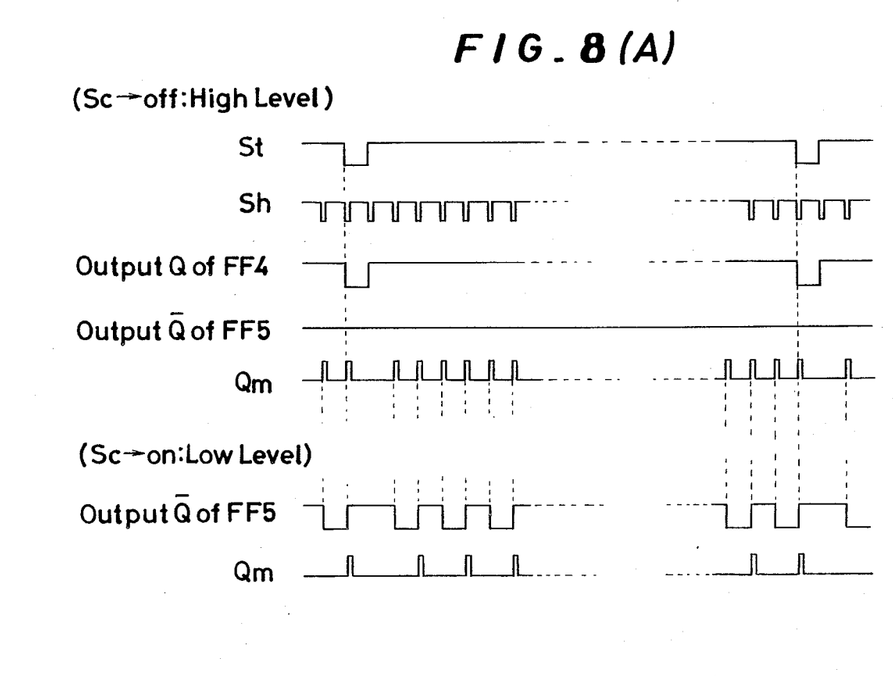

When the mode selection signal Sc becomes high to assume the equality mode as shown in FIG. 8(A), main scanning output pulses Qm are outputted from the scanning control circuit 60 in synchronization with the timing clock pulses Sh so that one pulse Qm is outputted each time the picture elements are updated one by one in the main scanning direction. When the mode selection signal Sc becomes low to assume the ½ reducing mode, one pulse Qm is outputted each time two timing clock pulses Sh are outputted. That is to say, in the ½ reducing mode, one pixel in the dither pattern D2 (one dither element value) is assigned to two picture elements of the read-out image Mb defined in a matrix.

On the other hand, one sub-scanning output pulse Qs in the equality mode in which the signal Sc becomes high is generated when the picture elements in the sub-scanning direction are updated one by one, to be exact, immediately after the sub-scanning encoder pulse Ep appears as illustrated in FIG. 8(B). When the mode selection signal Sc becomes low to assume the ½ reducing mode, one sub-scanning output pulse Qs is outputted each time two encoder pulses Ep appear. Namely, in the ½ reducing mode, one pixel in the dither pattern D2 (one dither element value) is assigned to two lines of the read-out image Mb defined in a matrix.

Thus, in the 1/m reducing mode, the n×n dither matrix pattern prepared for the equality mode assumes an mn×mn matrix. That is, in the ½ reducing mode, the 4×4 dither matrix pattern prepared for the equality mode as shown in FIG. 1(A) is virtually transformed into the 8×8 matrix pattern as shown in FIG. 3.

As will be clearly understood from the foregoing description, according to the present invention, the dither matrix pattern prepared for an equality function can be applied to an image reducing function by which a given original image is reduced to a scale of one-half or less, consequently to make the processing system simple. Furthermore, since one dither element value prescribed in the dither matrix pattern is assigned to two or more picture elements in the read-out image obtained by use of the image reading device, the resultant reduced image can be obtained with relatively high fidelity of image to the original image. Particularly, a halftone image such as a photograph can be effectively reduced and reproduced with high fidelity of image to the given original image on a monitor display of an image processing system, a printer of a wordprocessor, a facsimile or the like.

As can be readily appreciated, it is possible to deviate from the above embodiments of the present invention and, as will be readily understood by those skilled in this art, the invention is capable of many modifications and improvements within the scope and spirit thereof. Accordingly, it will be understood that the invention is not to be limited by these specific embodiments, but only by the scope and spirit of the appended claims.

What is claimed is:

1. In an image processing in which a given original image is read out to obtain a brightness matrix pattern composed of pixels representing brightness at each picture elements of the read out image defined in a matrix and said brightness at each pixel of the read-out image is sequentially compared with dither element values of a predetermined $n \times n$ dither matrix pattern, a method of image reduction for reducing said read-out image at a $1/m$ reduction rate, comprising the steps of:

deriving an $mn \times mn$ dither pattern composed of $n \times n$ dither element values defined in a matrix from said $n \times n$ dither matrix pattern;

comparing brightness of each pixel of said read-out image with dither element values prescribed in said $mn \times mn$ dither pattern at a pixel corresponding to that of said read-out image to obtain an intermediate dither image having a plurality of unit matrices; and extracting brightness features of the respective unit matrices in said intermediate dither image to obtain a reduced image represented by said brightness features corresponding to said original image.

2. A device for image processing capable of reducing a read-out image obtained in a matrix by digitizing a given original image in accordance with a predetermined $n \times n$ dither pattern, comprising:

a dither setting circuit having said $n \times n$ dither pattern composed of dither element values with which picture elements constituting the matrix of said read-out image are compared to obtain an intermediate dither image;

a mode selection circuit for selecting one of at least equality and reducing modes;

a subscanning encoder which is adapted to output one subscanning encoder pulse each time updating of subscanning;

a timing pulse generator for outputting regularly timing pulses; and a scanning control circuit for outputting said dither element values so that when said mode selection circuit selects the image reducing mode at a $1/m$ reduction rate, one dither element value is delivered each time m-subscanning encoder pulses from said subscanning encoder or m-timing pulses from said timing pulse generator are outputted.

3. A device for image processing capable of reducing a read-out image obtained in a matrix by digitizing a given original image in accordance with a predetermined $n \times n$ dither pattern, comprising:

a subscanning encoder for outputting a subscanning encoder pulse each time updating of subscanning;

a timing pulse generator for outputting regularly timing pulses;

a dither setting circuit having the dither pattern with dither element values with which picture elements constituting the matrix of said read-out image are compared to obtain an intermediate dither image;

a mode selection circuit for selecting one of at least equality and reducing modes;

a scanning control circuit for outputting said dither element values so that when said mode selection circuit selects the image reducing mode at a $1/m$ reduction rate, one dither element value is delivered each time m-subscanning encoder pulses from said subscanning encoder or m-timing pulses from said timing pulse generator are outputted so as to derive an $mn \times mn$ dither pattern composed of $n \times n$ dither element values defined in a matrix from said $n \times n$ dither matrix pattern;

a dither matrix resistance circuit having a plurality of resistors for obtaining said intermediate dither image; and a dither decision circuit for selecting said resistors of said dither matrix resistance circuit in accordance with the dither pattern, whereby a reduced image represented by said brightness features corresponding to said original image is obtained by comparing brightness of each pixel of said read-out image with said dither element values prescribed in said $mn \times mn$ dither pattern at a pixel corresponding to that of said read-out image to obtain said intermediate dither image having a plurality of unit matrices and extracting brightness features of the respective unit matrices in said intermediate dither image.

4. A method for image reduction of a read-out image according to claim 1, wherein the picture element at a specific location in each unit matrix of said intermediate dither image is adopted as the corresponding picture element of said reduced image.

5. A method for image reduction of a read-out image according to claim 1, wherein the picture element of said reduced image is determined as a black element when black picture elements in the unit matrix of said intermediate dither image are equal to or more than half the total picture elements of said intermediate dither image.

* * * * *